United States Patent [19]
Shimomura

[11] Patent Number: 5,647,705
[45] Date of Patent: Jul. 15, 1997

[54] CRANKSHAFT MILLER AND METHOD OF USE THEREOF

[75] Inventor: Masumi Shimomura, Ishikawa-ken, Japan

[73] Assignee: Kabushiki Kaisha Komatsu Seisakusho, Tokyo, Japan

[21] Appl. No.: 537,658

[22] PCT Filed: Apr. 8, 1994

[86] PCT No.: PCT/JP94/00598

§ 371 Date: Oct. 5, 1995

§ 102(e) Date: Oct. 5, 1995

[87] PCT Pub. No.: WO94/23872

PCT Pub. Date: Oct. 27, 1994

[30] Foreign Application Priority Data

Apr. 9, 1993 [JP] Japan .................................. 5-082844

[51] Int. Cl.$^6$ ........................................ B23C 3/06
[52] U.S. Cl. ........................ 409/132; 409/189; 409/199
[58] Field of Search ................................ 409/131, 132, 409/189, 197, 199

[56] References Cited

U.S. PATENT DOCUMENTS 4,171,654  10/1979  Kreucher .............................. 409/189
4,180,359  12/1979  Khmid ................................... 409/199
4,309,134  1/1982   Khmid ................................... 409/199

FOREIGN PATENT DOCUMENTS 58-16967  4/1983  Japan .
59-42211  3/1984  Japan .

Primary Examiner—Daniel W. Howell
Attorney, Agent, or Firm—Wenderoth, Lind & Ponack

[57] ABSTRACT

A crankshaft miller includes a pair of work heads for supporting both ends of a work, a cutter unit for processing the work and a work rest for supporting the work during processing. The cutter unit and the work rest are provided separately, but are coupled by a separable link mechanism for moving the work rest together with the cutter unit as necessary. A method of use of a crankshaft miller includes the steps of providing a pair of movable work heads for supporting both ends of the work, a cutter unit for processing the work and the work rest for supporting the work during processing. The cutter unit and the work rest are provided separately, but coupled by a separable link mechanism so that the work rest can be moved together with the cutter unit as necessary. Indexing of the work rest is performed with coupling the cutter unit and the work rest, indexing of the cutter unit is performed by separating the work rest and the cutter unit, and subsequently, processing of the work by the cutter unit is performed.

8 Claims, 5 Drawing Sheets

○ WORKING POSITION BY CUTTER UNIT

✕ CLAMP POSITION BY WORK REST

CRANKSHAFT MILLER AND METHOD OF USE THEREOF

TECHNICAL FIELD

The present invention relates to a crankshaft miller and method of use thereof, for working a crankshaft of an engine and so forth.

BACKGROUND ART

Conventionally, in a crankshaft miller for working a crankshaft, a work rest is provided so that a work (crankshaft) can be supported without causing displacement during working.

The work rest is normally secured on a saddle of a cutter unit supported on a bed of the crankshaft miller and a distance between the work rest and the cutter in a longitudinal direction of the bed cannot be adjusted. Therefore, when there are a plurality of kinds of works (or workpieces), portions of the works to be supported become different. Therefore, in recent years, the work rest has been provided movably in an axial direction (longitudinal direction of the bed), independently of the cutter unit and is moved by its own drive means provided within the bed.

However, the crankshaft miller which is designed to move the work rest by the own drive means, such as the above-mentioned conventional crankshaft miller, is difficult to design and produce so as to install the drive means, since the installation space for the drive means is originally quite small. In addition, since the drive means is frequently provided within the bed, difficulty may encountered in discharging chip generated during working.

The present invention improves the foregoing drawbacks. Therefore, it is an object of the invention to provide a crankshaft miller and method of use thereof which can facilitate design and production thereof and smoothly discharge chips.

SUMMARY OF THE INVENTION

In order to accomplish the above-mentioned objects, according to one aspect of the invention, there is provided a crankshaft miller, including a pair of work heads for supporting both ends of a work (or workpieces), a cutter unit for processing the work and a work rest for supporting the work during processing.

The cutter unit and the work rest are provided separately, but the cutter units and the work rest are coupled by a separable link mechanism for moving the work rest together with the cutter unit as necessary.

With the construction as set forth above, by coupling the cutter unit and the work rest by means of the link mechanism provided therebetween, indexing of the work rest (positioning in the longitudinal direction of the bed) can be performed by utilizing the drive motor of the cutter unit. Therefore, the independent drive means for moving the work rest as required in the prior art, becomes unnecessary.

Accordingly, a space to provide the drive means becomes unnecessary thereby facilitating design and production. Also, since the drive means is not present within the bed, the discharging of chips can be done smoothly.

Preferably, the link mechanism is provided between a saddle of the work rest and a saddle of the cutter unit.

On the other hand, the link mechanism may include engaging claws provided on the saddle of the work rest, a drive cylinder for driving the engaging craws provided on the saddle of the work rest, and an engaging member provided on a saddle of the cutter unit and engageable with the engaging claws.

Also, a rotary shaft extending perpendicularly to the moving direction of the saddle may be rotatably supported on the saddle of the work rest, the engaging claws may be fixed at two portions of the rotary shaft, and the rotary shaft may be connected with the drive cylinder via a lever fixed on one end thereof so that the engaging claws may be engaged to and released from the engaging member by rotating the rotary shaft by means of the drive cylinder.

On the other hand, according to another aspect of the invention, a method of use of a crankshaft miller comprises the steps of:

movably providing a pair of work heads for supporting at both ends of a work, a cutter unit for processing the work and a work rest for supporting the work during processing;

providing the cutter unit and the work rest separately, the cutter unit and the work rest being coupled by a separable link mechanism so that the work rest can be moved together with the cutter unit as necessary, wherein indexing of the work rest is performed by coupling of the cutter unit and the work rest, indexing of the cutter unit being is by separating the work rest and the cutter unit, and subsequently, processing of the work by means of the cutter unit is performed.

With the construction set forth above, after indexing of the work rest, indexing of the cutter unit is performed by separating the work rest and the cutter unit. Therefore, indexing of the cutter unit can be performed while the work rest clamps the work. With this, in comparison with the conventional processing, in which indexing is performed after the work rest unclamps the work, cycle time can be shortened to improve productivity.

Preferably, a plurality of times of indexing of the cutter unit and processing of the work by the cutter unit is performed for each time of indexing of the work rest.

Thus, works having different pin widths, journal widths, pin pitches or Journal pitches can be processed by one cutter. Also, even when the configuration of a desired rounded groove is different from the configuration of the cutting edge of the cutter, the groove has a configuration approximated to the desired rounded groove configuration.

The above-mentioned operation may be repeated for each portion of the work to be processed.

BRIEF DESCRIPTION OF THE DRAWINGS

The present invention will be understood more fully from the detailed description given herebelow and from the accompanying drawings of the preferred embodiment of the invention, which, however, should not be taken as limiting the present invention, but are for explanation purposes only.

In the drawings.

PREFERRED EMBODIMENT OF THE INVENTION

Discussion will be given hereinafter for a preferred embodiment of a crankshaft miller and a method of use thereof of the present invention, with reference to the accompanying drawings.

Figure 1:
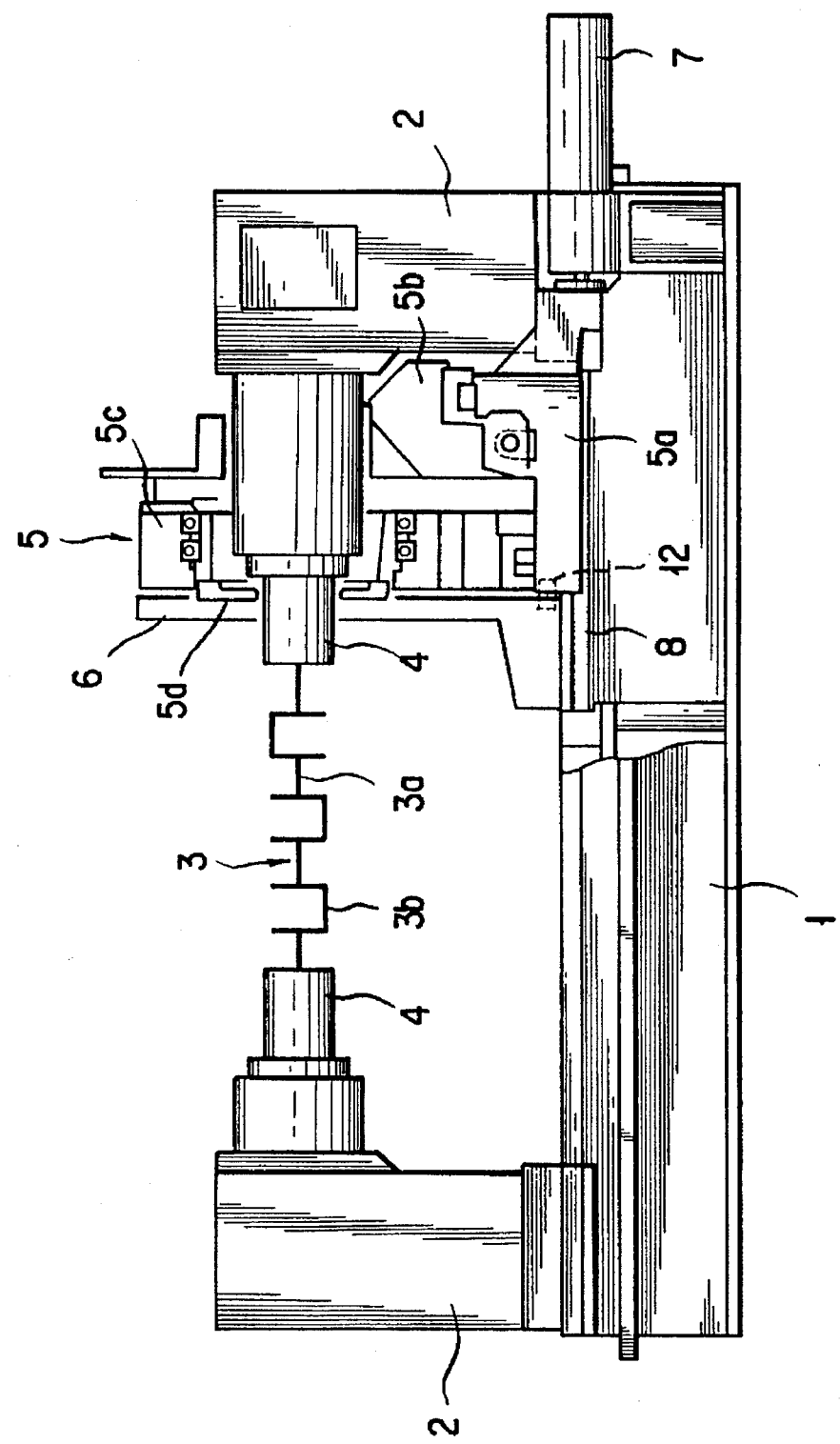
FIG. 1 is a front elevation of one embodiment of a crankshaft miller according to the present invention.

FIG. 1 shows a crankshaft miller. On a bed 1, two work heads 2 are provided. On opposing surfaces of the work heads 2, chucks 4 for clamping both ends of a (or workpiece) 3 are provided, respectively.

On the other hand, on the bed 1 between the above-mentioned work heads 2, a cutter unit 5 and a work rest 6 are provided movably in the longitudinal direction of the bed 1, respectively.

The above-mentioned cutter unit 5 has a saddle 5a threadingly engaged with a ball screw shaft 8 rotated by a drive motor 7 which is provided at one end of the bed 1. On the saddle 5a, a slide 5b movable in a direction perpendicular to the moving direction of the saddle 5a, is provided.

For the slide 5b, a swing arm 5c, which is rockable in the vertical direction by means of an unshown rocking mechanism, is provided. For the swing arm 5c, an internal cutter is 5d is provided for cutting the work 3 during rotation of the internal cutter.

Figure 2:
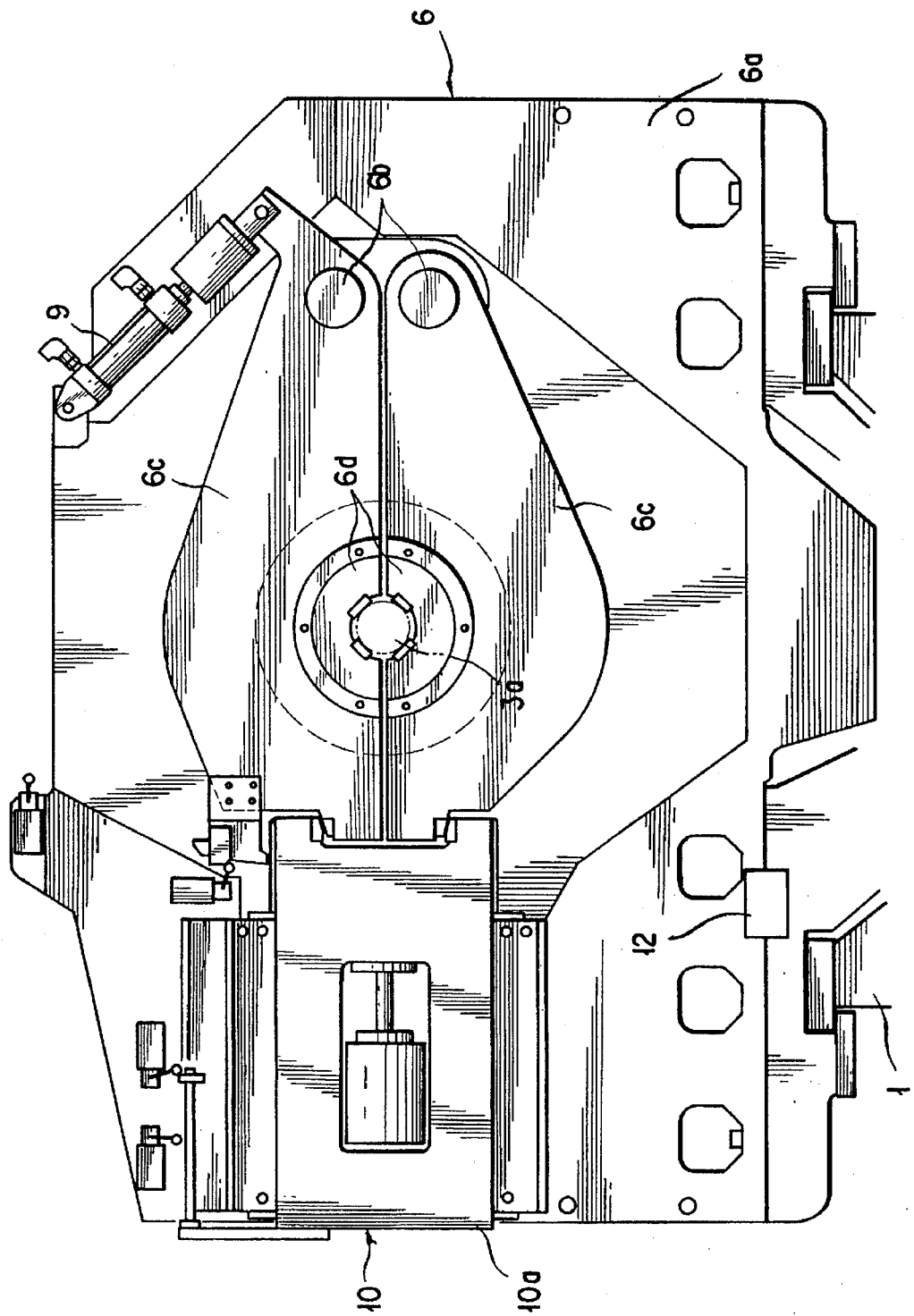
FIG. 2 is a side elevation of a work rest provided in the above-mentioned embodiment.

On the other hand, as shown in FIG. 2, the work rest 6 is provided with a pair of rest arms 6c which are opened and closed about support shafts 6b by means of an arm cylinder 9 mounted on the saddle 6a which moves above the bed 1. On the opposing surfaces of the rest arms 6c, rest holders 6d for supporting a journal 3a of the work 3 the vertical direction, are provided.

On the other hand, the opening and closing ends of the rest arms 6c are clamped vertically by engaging in a recessed portion at the tip end of a lock plate 10a of a lock mechanism 10 provided at the body of the work rest 6 so that the rest arms 6c do not open during processing of the work 3.

Between the saddle 6a of the work rest 6 and the saddle 5a of the cutter unit 5, a link mechanism 12 is provided.

Figure 3:
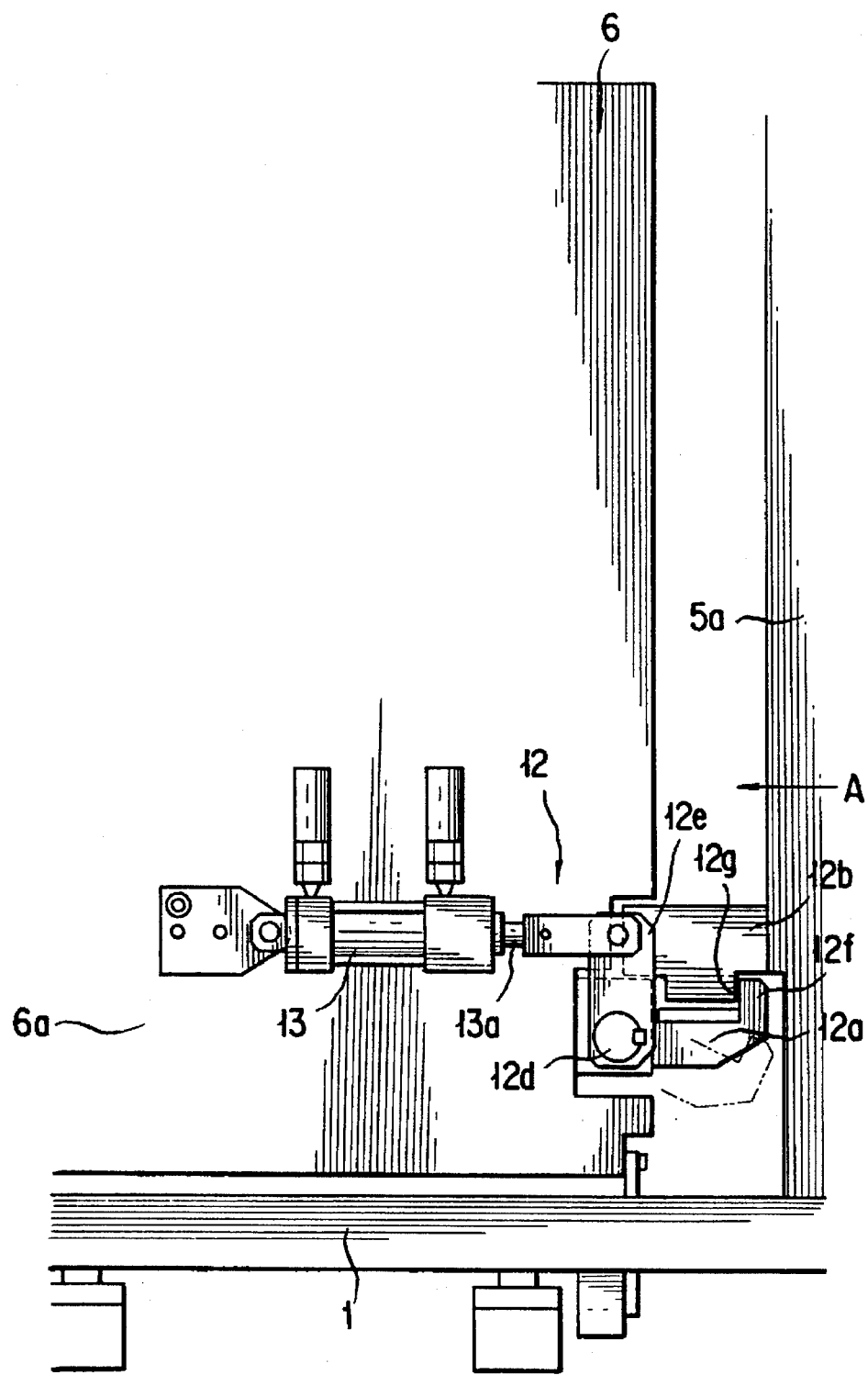
FIG. 3 is a front elevation showing a detail of a link mechanism provided in the above-mentioned embodiment.
Figure 4:
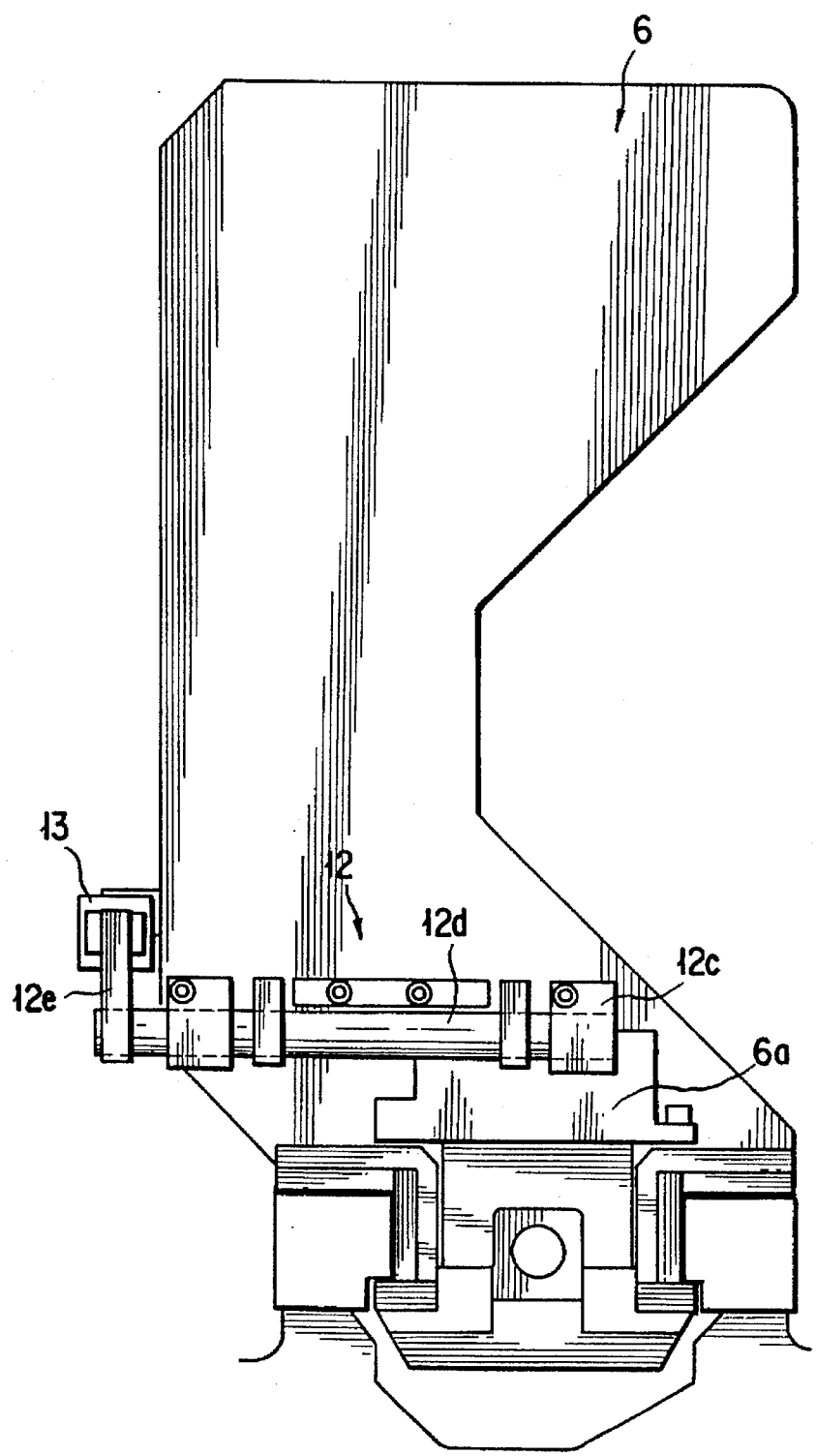
FIG. 4 is an illustration as viewed along an arrow A in FIG. 3.

As shown in FIGS. 3 and 4, the link mechanism 12 is provided with engaging claws 12a at the side of the saddle 6a of the work rest 6 and an engaging member 12b engaging with the engaging claws 12a at the side of the saddle 5a of the cutter unit 5.

The engaging claws 12a are provided at two portions of a rotary shaft 12d which is pivotally supported on the saddle 6a via a bearing 12c and extends perpendicular to the moving direction of the saddle 6a. A base end portion of a lever 12e is fixedly secured on one end side of the rotary shaft 12d.

On the tip end of the lever 12e, a piston rod 13a of a drive cylinder 13 provided on the saddle 6a is connected. By rotating the rotary shaft 12d by means of the drive cylinder 13, the engaging claws 12a are pivoted about the rotary shaft 12d so that hooks 12f formed at the tip ends of the engaging claws 12a are engaged with cut-outs 12g of the engaging member 12b from the lower side thereof.

Next, the operation of the illustrated embodiment will be discussed.

At first, once the work 3 to be worked is clamped at both ends by the chucks 4, the work rest 6 is moved to the position of the journal 3a adjacent a pin 3b, from which working is started.

The cutter unit 5 is moved until it contacts with the work rest 6 by means of the drive motor 7. At this position, the engaging claws 12a of the link mechanism 12 are pivoted by the drive cylinder 13 to engage with the engaging member 12b.

Then, in this condition, the work rest 6 is moved to the position of the journal 3a to be supported, by moving the cutter unit 5 again by the drive motor 7. At this position, by means of an unshown clamp mechanism, the work rest 6 is fixed onto the bed 1. In conjunction therewith, by means of the rest arms 6c, the journal 3a of the work 3 is supported. Then, the rest arms 6c are locked against opening by the lock plate 10a.

Next, by releasing the link mechanism 12, the work rest 6 and the cutter unit 5 are separated. Then, the cutter unit 5 is moved to the working position of the work 3 to start working of the pin 3b at that position.

By repeating the foregoing operation at the completion of each operation, the work rest 6 can be moved to the predetermined position utilizing the drive motor 7 for the cutter unit 5.

Figure 5A:
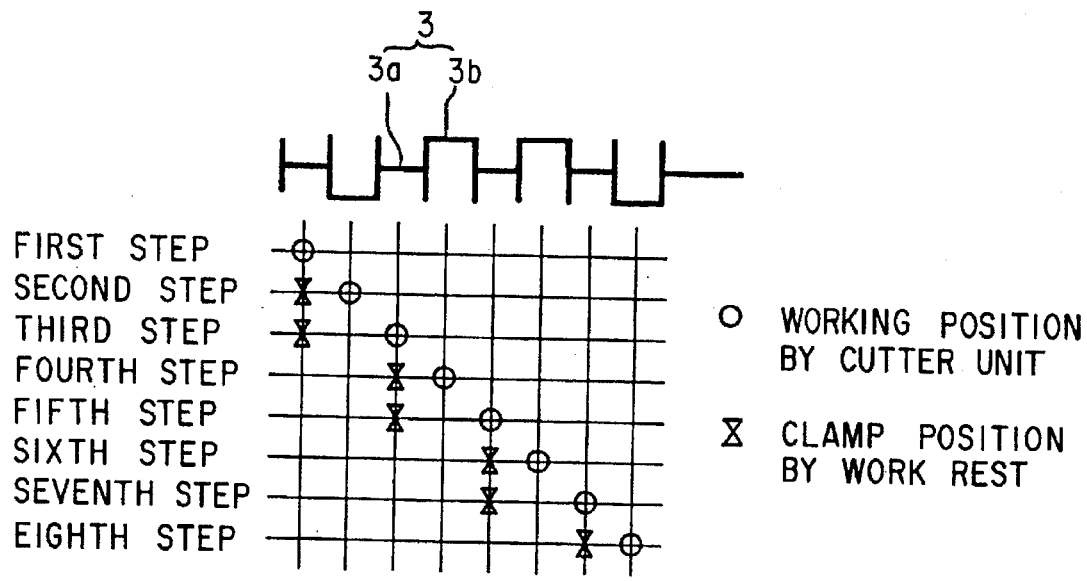
FIGS. 5A to 5C are explanatory illustrations showing operations for working in the above-mentioned embodiment.

It should be noted that FIG. 5A shows a relationship between the working position and rest position of the work 3 in the overall working operation of the work 3 for each respective working step.

In the illustrated case, with respect to indexing of the work rest 6 for one operation, indexing of the cutter unit 5 and processing of the work 3 by the cutter unit 5 are performed twice.

Figure 5B:
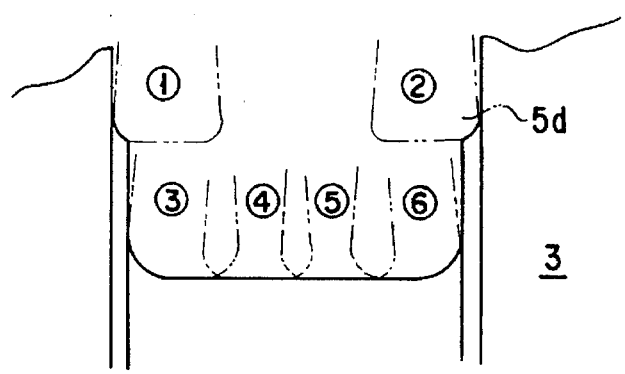

On the other hand, the number of operations by the cutter unit 5 for each indexing of the work rest 6, can be increased. As shown in FIG. 5B, by means of one internal cutter 5d, the same portion of the work 3 can be seperated into 6 separate processes, for example. Thus, it becomes possible to process works having different pin widths, journal widths, pin pitches or journal pitches by one internal cutter 5d.

Figure 5C:
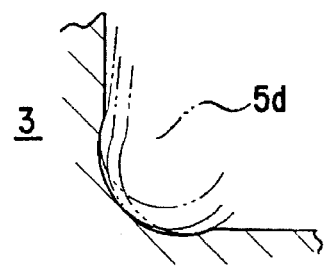

Even when the configuration of a rounded groove is different from the configuration of the internal cutter 5d, the configuration of the worked groove can be approximated with the desired rounded groove by working of the rounded groove by dividing the processing into a plurality of separate working operations, as shown in FIG. 5C.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed by the appended claims and equivalents thereof.

I claim:

1. A crankshaft miller, in which a pair of work heads support both ends of a work, a cutter unit for working the work and a work rest for supporting the work during working are provided, wherein:

said cutter unit and said work rest are provided separately, and said cutter unit and said work rest are coupled by a separable link mechanism for moving said work rest together with said cutter unit upon necessity.

2. A crankshaft miller as set forth in claim 1, wherein said link mechanism is provided between a saddle of said work rest and a saddle of said cutter unit.

3. A crankshaft miller as set forth in claim 2, wherein said link mechanism includes at least one engaging claw provided on the saddle of said work rest, a drive cylinder for driving said at least one engaging claw provided on said saddle of said work rest, and an engaging member provided on a saddle of said cutter unit and engageable with said at least one engaging claw.

4. A crankshaft miller as set forth in claim 3, wherein a rotary shaft extending perpendicularly to the moving direction of said saddle is rotatably supported on said saddle of said work rest, said at least one engaging claw comprises two engaging claws respectively fixed at two portions of said rotary shaft, and said rotary shaft is connected with said drive cylinder via a lever fixed on one end thereof so that said engaging claws may be engaged and released to and from said engaging member by rotating said rotary shaft by means of said drive cylinder.

5. A method of use of a crankshaft miller comprising the steps of:

movably providing a pair of work heads for supporting both ends of a work, a cutter unit for working said work and a work rest for supporting said work during working;

providing said cutter unit and said work rest separately, said cutter unit and said work rest being coupled by a separable link mechanism so that said work rest can be moved together with said cutter unit upon necessity;

indexing of said work rest being performed by coupling of said cutter unit and said work rest, indexing of said cutter unit being performed by separating said work rest and said cutter unit, and subsequently, working of said work by means of said cutter unit being performed.

6. A method of use of a crankshaft miller as set forth in claim 5, wherein a plurality of times of indexing of said cutter unit and working of the work by said cutter is performed in relation to one time of indexing of said work rest.

7. A method of use of a crankshaft miller as set forth in claim 5, wherein the above-mentioned operation is repeated for each portion of the work to be worked.

8. A method of use of a crankshaft miller as set forth in claim 6, wherein the above-mentioned operation is repeated for each portion of the work to be worked.

* * * * *